Feb. 2, 1926.
E. H. DIECKMANN
1,571,236
TRACTOR
Filed Dec. 31, 1923
2 Sheets-Sheet 1
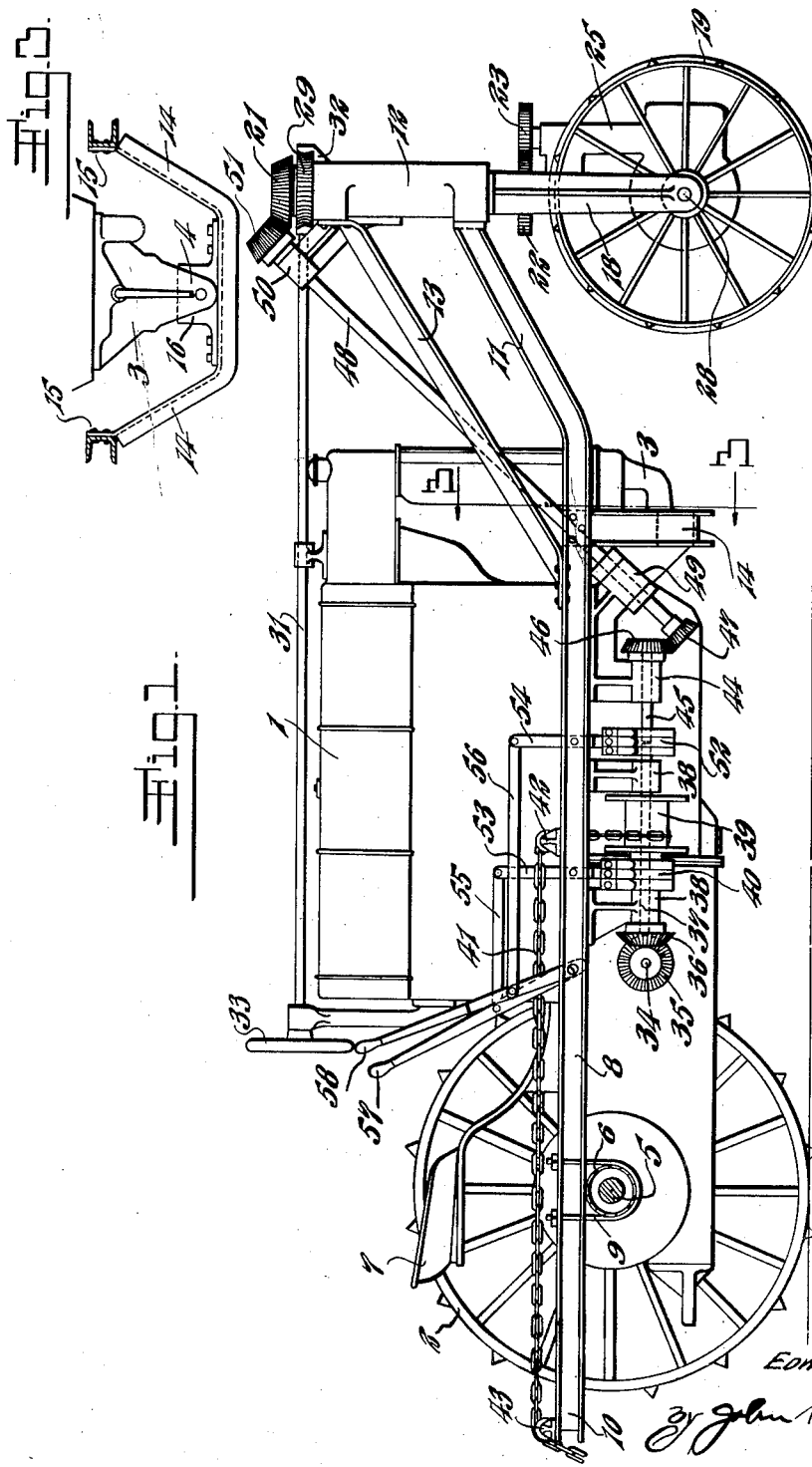
Inventor:
Edward H. Dieckmann,
by John N Bruninga
His Attorney.

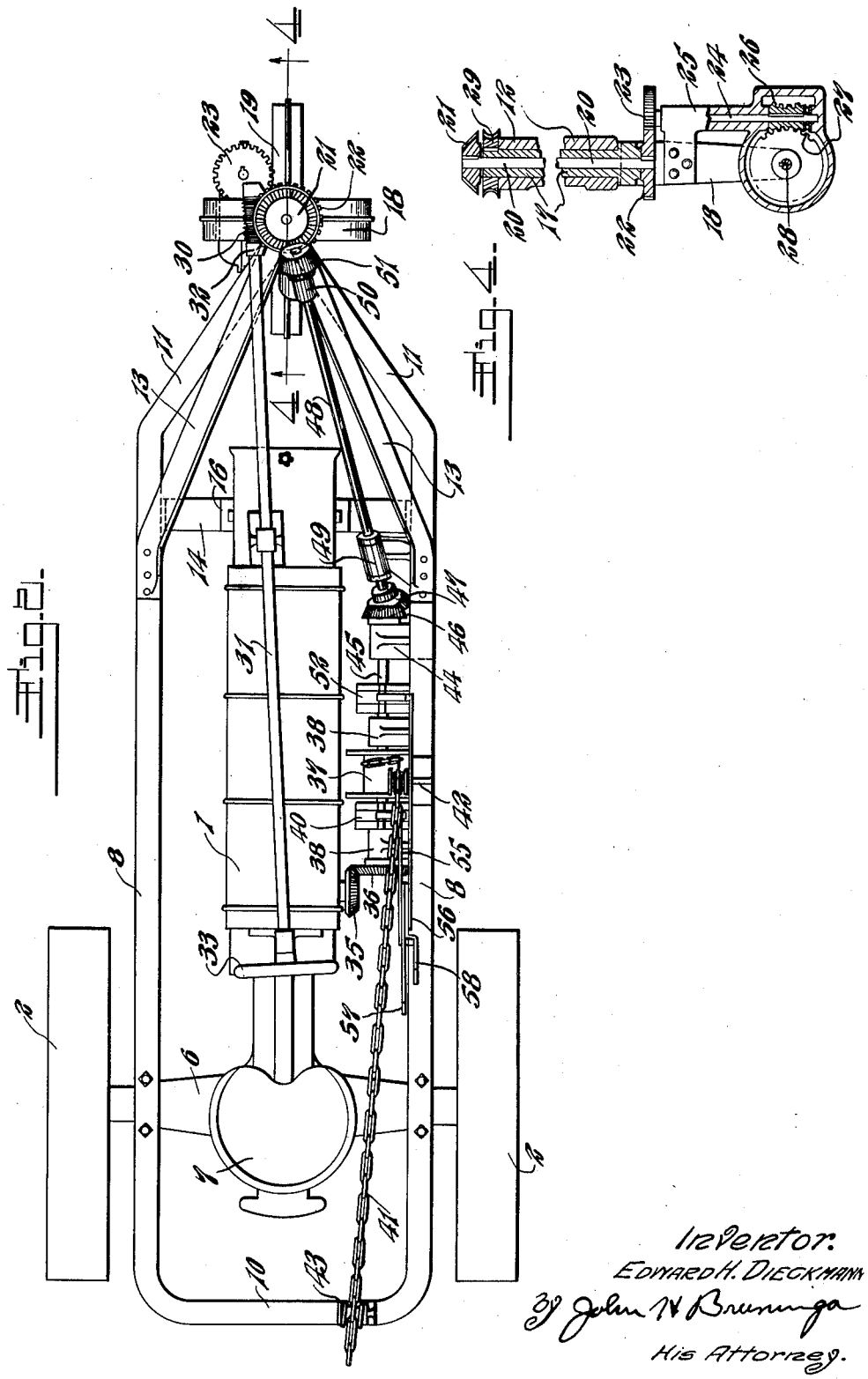

Patented Feb. 2, 1926.

1,571,236

UNITED STATES PATENT OFFICE.

EDWARD H. DIECKMANN, OF FLORISSANT, MISSOURI.

TRACTOR.

Application filed December 31, 1923. Serial No. 683,698.

*To all whom it may concern:*

Be it known that I, EDWARD H. DIECKMANN, a citizen of the United States, and residing at Florissant, State of Missouri, have invented the new and useful Improvement in Tractors, of which the following is a specification.

This invention relates to tractors and more particularly to tractors adapted for use in farming operations, such as disclosed in my Patent No. 1,324,309, patented December 9, 1919.

The ordinary tractor designed for farming and similar operations is usually provided with a pair of traction wheels and a pair of steering wheels according to the ordinary vehicle practice. In farming operations with a tractor of this type, it frequently happens that the steering wheels must operate on broken ground so that their purchase on the ground for guiding the tractor is insecure which renders steering difficult and uncertain. With two steering wheels, especially when these are arranged to pivot each about its own end of the front axle as is usual in power driven tractors, it is difficult to make a short turn since with the wheels turned to the limit of their movement, a turn of considerable radius is necessary. This difficulty is further increased by the fact that the operation is over rough or broken ground and different wheels may run on different kinds of ground so that their steering action is uncertain.

One of the objects of this invention, therefore, is to provide a steering mechanism for a tractor which will render the turning of sharp corners easy of accomplishment.

Another object of this invention is to provide steering mechanism in which the steering wheel may be power driven and so arranged as to facilitate the turning operation even on rough ground.

Another object of this invention is to provide means in connection with such a tractor for properly handling the farming machinery drawn thereby so as to facilitate turning movements.

Another object of this invention is to provide an improved steering mechanism which is arranged to be easily applied to an existing tractor.

Further objects will appear from the detailed description taken in connection with the accompanying drawings, in which:

Figure 1 is a side elevation illustrating a tractor embodying this invention;

Figure 2 is a plan view of the same;

Figure 3 is a detail section taken approximately on line 3—3, of Figure 1; and

Figure 4 is a detail section taken on line 4—4, Figure 2.

Referring to the accompanying drawings, 1 designates the power plant of a tractor of any well known type having traction wheels 2. Such a tractor is ordinarily equipped with a bracket 3 provided with a socket 4 or other suitable means for pivotally mounting a front axle. Such a tractor may be provided with a rear axle 5 enclosed in a suitable housing 6. A seat 7 is ordinarily provided for the driver.

In accordance with this invention a built-up chassis is provided which comprises a pair of side members 8 adapted for connection to the driving wheels 2. Such connection may be carried out by attaching the side members 8 to the axle housing 6 as, for instance, by means of U-bolts 9 surrounding said housing and clamping the side members thereto, as illustrated more particularly in Figure 1. The side members 9 may have formed integral therewith or attached thereto a rear extension 10 for a purpose which will be presently described. The forward ends of the side members 8 are bent inwardly and upwardly forming an inclined member 11 adapted for attachment to a vertical bearing member 12 at the front of the chassis. This part of the chassis may be braced by a second pair of inclined members 13 attached at their forward ends to the bearing 12 and at their rearward ends to the side members 8 so as to stiffen the chassis and to support the bearing 12 in a vertical position. Connecting the side members 8 at the forward end of the chassis is a cross-member 14. This member may be attached to the side members by bolts, rivets or other suitable fastenings as indicated at 15. In the illustrated construction the member 14 extends downwardly from the side members 8 and is provided with a bearing block 16 adapted to receive the bracket 3 and to be attached thereto for supporting the forward end of the power plant.

The power plant is thus supported at its rearward end on the traction wheels 2 and at its forward end on the chassis which in turn is supported on the bearing 12.

The bearing 12 comprises a hollow casting suitable for attachment to the chassis as above described and having a bore adapted to receive the shank 17 of a steering fork 18 carrying the single steering wheel 19. The shank 17 is adapted to swivel in the bearing 12 so as to provide for turning the fork 18 so as to turn the steering wheel for steering. The shank 17 is in turn provided with a bore adapted to receive a vertical driving shaft 20 having keyed thereto at its upper end a bevel gear 21 and at its lower end and within the prongs of the fork 18 a gear 22. The latter gear 22 meshes with a pinion 23 on the upper end of a vertical shaft 24 mounted in a suitable bearing 25 on the fork 18 and carrying at its lower end a worm 26 adapted for driving connection with a worm wheel 27 keyed to the axle 28 to which the steering wheel 19 is also fixed. Through this train of gearing, driving power may be transmitted to the steering wheel as will presently be described. The gears 22 and 23 are located within the prongs of the fork 18 so that the same may be turned about in steering without deranging this train of gearing.

The upper end of the shank 17 has keyed thereto a worm wheel 29 adapted for operation by a worm 30 on a steering shaft 31 suitably supported in a bearing 32 on the chassis and extending rearwardly to the driver's seat, being provided with a steering wheel 33 at its rearward end. Thus by operating the steering wheel 33, the shank 17 and, therefore, the fork 18 may be turned in the bearing 12 for steering. Tractors of standard construction, at least of one well known type, are provided with a power operated shaft 34 which is ordinarily provided with a pulley or other suitable connection for operating auxiliary machinery. In accordance with the present invention the shaft 34 may be connected as by means of a pair of beveled gears 35 and 36 with a horizontal countershaft 37 mounted in suitable bearings 38 on the chassis. The shaft 37 carries loosely thereon a winding drum 39 which may be connected to the shaft 37 for either forward or reverse rotation or disconnected therefrom by means of clutch mechanism 40. The mechanism 40 may take the form of the well known planetary transmission used on the well known Ford type of automobile. The drum 39 is adapted for winding or unwinding a chain or cable 41 passing over pulleys 42 and 43 on the chassis. The pulley 43 may be located on the rear extension 10 and the cable 41 passes thereover to be connected to the plow or other farming device, which the tractor is intended to pull. The connection of the cable 41 is independent of the connection for pulling the plow but is attached to suitable lifting mechanism which is a part of the equipment of certain types of plows and which is adapted for lifting the plows clear of the ground during turning operation. Means are thus provided for applying the power of the power plant to the operation of these plows preliminary to the turn at each end of the field being plowed.

Mounted in a suitable bearing 44 is a counter-shaft 45 carrying at its forward end a beveled gear 46 adapted for engagement with a similar gear 47 on an inclined shaft 48 mounted in suitable bearings 49 and 50 and carrying at its upper end a gear 51 adapted for engagement with the gear 21 on the upper end of the shaft 20. The shaft 45 is adapted for connection by means of a transmission device 52 similar to the device 40 to the counter-shaft 37. Connections are thus provided from the power plant through the shafts 34, 37, 45, 48, 20 and 24 to the steering wheel 19 for driving this wheel in either forward or reverse direction.

Control levers 53 and 54 are adapted for operating respectively the trasnmission devices 40 and 52. These levers are connected by means of links 55 and 56 respectively to control handles 57 and 58 by means of which the driver from his place in the seat 7 may control the operation of the lifting cable 41 or of the mechanism for driving the steering wheel 19.

In accordance with this invention, therefore, a device is provided which may be attached to a tractor of standard construction. By means of this device the tractor is adapted for use in farming operations as, for instance, drawing a gang plow and the turning operations which ordinarily require short turns are facilitated. During ordinary operations turning may be accomplished simply by the steering movement of the wheel 19 and the purchase of this wheel on the ground may be depended on to guide the tractor. Under more difficult conditions as, for instance, where the ground is broken and the purchase of the wheel uncertain, the turning movement may be assisted by establishing driving connections between the power plant and the steering wheel so that the steering wheel will exert a tractive effort for turning the vehicle. Again when a particularly short turn is required, the wheel 19 may be turned to a position practically at right angles to the axis of the chassis so that when driven by the power plant it will cause the tractor to swivel about the rear wheels. With the steering wheel adapted for driving connection in either forward or reverse direction practically any situation can be met in a satisfactory manner.

This invention also provides means for handling the plow or other farming device which the tractor may be operating in such a manner as to facilitate the movements thereof. Such machines as are provided with mechanism for disengaging their blades from the ground during turning movements may be power operated by means of the cable 41. In such cases the operator has complete control of such operations from the driver's seat.

It is obvious that various changes may be made in details of construction without departing from the spirit of this invention; it is, therefore, to be understood that this invention is not to be limited to the specific details shown and described.

Having thus described the invention, what is claimed is:

1. In combination with a tractor of standard manufacture having a frame, a motor thereon, traction wheels driven by the motor, and an auxiliary power shaft driven by the motor and accessible from the outside of the frame, a chassis comprising a pair of longitudinal side members supported at their rear by the traction wheels and a cross member supporting the forward part of the frame, a steering wheel supporting the forward end of said chassis, connections from said auxiliary shaft adapted to drive said steering wheel, a winding drum connected to be driven by said auxiliary shaft, and a cable passing from said drum rearwardly along said chassis adapted for operating an implement drawn by the tractor.

2. In combination with a tractor of standard manufacture having a frame, a motor thereon, traction wheels driven by the motor, and an auxiliary power shaft driven by the motor and accessible from the outside of the frame, a chassis comprising a pair of longitudinal side members supported at their rear by the traction wheels and a cross member supporting the forward part of the frame, a steering wheel supporting the forward end of said chassis, connections from said auxiliary shaft adapted to drive said steering wheel, a winding drum connected to be driven by said auxiliary shaft, a cable passing from said drum rearwardly along said chassis adapted for operating an implement drawn by the tractor, and reversible controlling connections for said drum.

3. In combination with a tractor of standard manufacture having a frame, a motor thereon, traction wheels driven by the motor, and an auxiliary power shaft driven by the motor and accessible from the outside of the frame, a chassis comprising a pair of longitudinal side members supported at their rear by the traction wheels and a cross member supporting the forward part of the frame, a steering wheel supporting the forward end of said chassis, a counter-shaft mounted on and along said chassis and connected to be driven by said auxiliary shaft, connections from said counter-shaft adapted for driving said steering wheel, a winding drum adapted to be driven by said counter-shaft, and a cable passing from said drum rearwardly along said chassis adapted for operating an implement drawn by the tractor.

In testimony whereof I affix my signature this 26th day of December, 1923.

EDW. H. DIECKMANN.